(12) United States Patent
Koseki et al.

(10) Patent No.: US 7,397,507 B2
(45) Date of Patent: Jul. 8, 2008

(54) METHOD AND APPARATUS FOR PROCESSING A PIXEL SIGNAL

(75) Inventors: Ken Koseki, Kanagawa (JP); Tsutomu Haruta, Kanagawa (JP); Yukihiro Yasui, Kanagawa (JP); Yasuaki Hisamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1240 days.

(21) Appl. No.: 10/406,343

(22) Filed: Apr. 3, 2003

(65) Prior Publication Data

US 2003/0214688 A1 Nov. 20, 2003

(30) Foreign Application Priority Data

Apr. 4, 2002 (JP) ............................. 2002-102108

(51) Int. Cl.
*H04N 5/16* (2006.01)
(52) U.S. Cl. ..................... 348/257; 348/294; 348/374; 348/308
(58) Field of Classification Search ................. 348/257, 348/294, 308, 374
See application file for complete search history.

(56) References Cited

U.S. PATENT DOCUMENTS 6,717,128 B2 * 4/2004 Afghahi ..................... 348/308

2004/0008270 A1 * 1/2004 Hisamatsu et al. .......... 348/257

FOREIGN PATENT DOCUMENTS

| JP | 06-350929 | 12/1994 |
|---|---|---|
| JP | 07-203319 | 8/1995 |
| JP | 10-233965 | 9/1998 |
| JP | 2000-050287 | 11/2000 |

* cited by examiner

*Primary Examiner*—Tuan Ho
*Assistant Examiner*—Gevell Selby
(74) *Attorney, Agent, or Firm*—Robert J. Depke; Rockey, Depke & Lyons, LLC.

(57) ABSTRACT

An NchMOS transistor Q71 on the input side of a current mirror 70 is made function as a voltage operating-point setting portion so that a pixel signal line potential (voltage of a horizontal signal line 20) would be constantly stable nearly at the GND. Then, an amplification factor and linearity become good in an amplification transistor in the solid imaging device 3. A current copier 90 is made function as a current sampling portion so as to receive a signal current IIN of the solid imaging device 3 through the current mirror 70 to carry out sampling of a pixel signal in a resetting period in the shape of current component as the pixel signal is. Calculating differential between a current component in a detecting period and an offset current, which is the current component in a resetting period in sampling, allows an offset component included in the pixel signal to be removed and only pure signal Isig to be picked up at an output terminal Iout, so that the FPN restraining function can be fulfilled.

15 Claims, 9 Drawing Sheets

(A)

(B)

(A)

(B)

(C)

METHOD AND APPARATUS FOR PROCESSING A PIXEL SIGNAL

This application claims priority to Japanese Patent application P2002-102108, filed Apr. 4, 2002, which is incorporated herein by reference.

FIELD OF THE INVENTION

The present invention relates to a method and apparatus of processing a pixel signal in a solid state imaging device and imaging apparatus. More particularly, it relates to a method and apparatus of processing a pixel signal output from a current-output type of solid imaging device, which outputs in the form of electric current a pixel signal received by a picture element. For example, the invention may be used with a CMOS type of imaging device and an amplification type of imaging device as well as an imaging apparatus comprising such solid state imaging devices.

DETAILED DESCRIPTION OF THE RELATED ART

In a solid state imaging apparatus, generally, each light receiving element comprising, for example, a photodiode, carries out photoelectric conversion so that a detecting circuit detects generated charges. These charges are then amplified and output one after another. The detecting circuit alternately performs a detecting operation and a resetting operation in most cases. The detecting circuit generates a noise signal referred to as reset noise, which causes an offset component to be produced for every picture element. In the case of a so-called amplification type of solid imaging device in which the detecting circuit is provided for every light receiving element, dispersion of the detecting circuit per se causes a noise signal referred to as fixed pattern noise (FPN) to be generated. Such an FPN signal can be removed using a known signal processing method that is referred to as correlated double sampling (CDS, hereinafter).

There are several methods for performing an FPN reducing function (the CDS processing function). In most cases, subtraction between a detected signal and a resetting signal is carried out in any method to only output the differential. Such subtraction is typically performed by means of a voltage signal since it requires sampling. Therefore, in the case of a current output type of solid imaging device in which a pixel signal is output via a current such as an X-Y address type of solid imaging device embodied in a CMOS imaging device or an amplification type of imaging device, it is necessary to use a current-voltage converting circuit (referred to as an I/V converting circuit, hereinafter) in order to perform conversion of the current into a voltage signal. In this case, a complicated analog signal process carried out in an I/V converting circuit. This typically includes implementation of a sampling circuit and a subtracting circuit. This causes a problem due to the fact that the circuit size necessarily becomes large.

On the other hand, there is another idea that the FPN reducing function is fulfilled by using a current signal as it is. A subtracting process such as the CDS is likely to be comparatively simply completed since a current signal is characterized by being easily added and subtracted. See, for example, IEEE TRANSACTIONS ON ELECTRON DEVICE, VOL44, No. 10 On-Focal-Plane Signal Processing for Current-Mode Active Pixel Sensors; (referred to as Document 1, hereinafter). This reference introduces a method for fulfilling the FPN reducing function by using a current copier having a two-cell structure, as shown in FIG. 10A. An operation of the structure will be briefly described. Document 1 introduces two driving methods illustrated in FIGS. 10B and 10C.

In the driving method shown in FIG. 10B, first, controlling signals Φ1 and Φ1S (including corresponding reverse polarity signals; same in the following) are used to make an n-channel of a current copier (a current storing cell) enter an input phase while controlling signals Φ2 and Φ2S are used to make a p-channel of current copier enter an output phase. A picture element is reset and an offset current Ioff is delivered to the n-channel of the current copier to be stored. Then, the controlling signals Φ1 and Φ1S are used to make the n-channel of current copier enter the output phase while controlling signals Φ2 and Φ2S are used to make the p-channel of current copier enter the input phase. A signal is read from a photodiode and "Ioff-Isig" is delivered from a picture element. The n-channel of the current copier provides the current Ioff having been stored in advance, and therefore, a signal Isig is only delivered to the p-channel current copier. Storing and outputting the delivered signal Isig allow the offset current Ioff to be removed, so that an original signal Isig in which the FPN has been removed can be output.

It should be noted, however, in the above driving method shown in FIG. 10B, that potential of an output signal line of a picture element may change in respective phases. In other words, in the case that an n-channel of the current copier is in the input phase, an n-channel of transistor has a diode-connected structure in which a gate and a drain are connected, so that the potential of a signal line would have a bias value corresponding to Vth of the n-channel transistor+the then current value and the transistor size and the potential would comparatively easily approach a GND level.

On the other hand, in the case that an n-channel of the current copier is in the output phase while a p-channel of current copier is in the input phase, a p-channel of transistor has a diode-connected structure, so that potential of a signal line would be a bias value corresponding to VDD—Vth of the p-channel transistor—the then current value and the transistor size and the potential would comparatively easily approach a source voltage level.

As described above, the potential of a signal line is determined in different manner in respective phases, and therefore, the potential may vary significantly. As described in JP-A-2000-307958 "Solid Imaging Device and Pixel Signal Processing Method thereof" (referred to as Document 2, hereinafter), for example, in an amplification type of solid imaging device having a transistor for amplification in each picture element, it is not preferable that the potential of a signal line greatly vary because the potential of a signal line has significant influence on an amplification factor of the amplification transistor.

Furthermore, it is better for the potential of a signal line to be as close to the GND level as possible when an n-channel amplification transistor is provided in a picture element in order to ensure a large amplification factor. In consideration of the above factors, it is not preferable to use the driving method shown in FIG. 10B in order to fulfill the FPN reducing function, in light of the fact that the potential of a signal line varies. Using the driving method may cause a problem such as deterioration of linearity of a pixel signal or reduction in signal quantity.

On the other hand, in a driving method shown in FIG. 10C, first, controlling signals Φ1 and Φ1S are used to make an n-channel of the current copier enter an input phase while controlling signals Φ2 and Φ2S are used to make a p-channel of the current copier enter an output phase and a pixel signal "Ioff-Isig" is stored in the n-channel of current copier. Then, the controlling signal Φ1 is used to separate a pixel signal line from a main circuit and the current "Ioff-Isig" stored in the n-channel of current copier is transferred to the p-channel of current copier to be stored.

A picture element is reset in the above period. After completing the reset, the controlling signals Φ1 and Φ1S are used to make the n-channel of current copier enter the input phase while the controlling signals Φ2 and Φ2S are used to make the p-channel of current copier enter the output phase and a pixel signal Ioff is stored in the n-channel of current copier.

Finally, the controlling signal Φ1 is used to separate the pixel signal line, both of the n-channel of current copier and the p-channel of current copier are made enter the output phase and the controlling signal Φ3 is used to open a switch. Then, "Iout=(Ioff-Isig)-Ioff=-Isig", so that an offset component Ioff would be removed and a signal Isig in which the FPN (fixed pattern noise) is removed can be output.

In the driving method shown in FIG. 10C, it should be noted that time for separating a pixel signal line from a circuit by means of a controlling signal Φ1 must be necessarily required. Accordingly, the potential of the pixel signal line is significantly unstable during this period of time. Moreover, sampling is independently carried out for the pixel signal "Ioff-Isig" and the signal in resetting Ioff. It means that two current copiers 90 must be required. As a whole, further four phases of storing, transferring, storing and outputting are required, which causes the problem of requiring extremely complicated control.

Document 1 also discloses that a driving method of the described circuit can be modified so that a current copier at the preceding step side can be used to output a signal Isig in which the FPN (fixed pattern noise) is removed. In this case, however, the controlling signal Φ1 should be also switched and a problem of variation in potential of a signal line still exists. Therefore, an amplification transistor in a solid imaging device cannot maintain a high amplification factor and linearity deteriorates.

As described hereinbefore, a process for reducing the FPN such as a CDS process is required in the case of using a current output type of solid imaging device. In this case, a complicated analog signal process is necessary when a known CDS process is carried out after converting a current signal into a voltage signal.

In the current output type of solid imaging device, using a current signal may simplify the FPN reducing process. Methods having been reported up to now such as those employing a CDS process, however, these proposed methods have the problem such that a potential of a pixel signal line greatly vary or is unstable.

In view of the above, one object of the present invention is to provide a pixel signal detecting method and apparatus and an imaging apparatus in which potential of a signal line is stable while a current signal in which fixed pattern noise is removed can be obtained when using a current output type of solid imaging device. Other objects and advantages of the present invention will be apparent in light of the following Summary and Detailed Description of the Presently Preferred Exemplary Embodiments.

SUMMARY OF THE INVENTION

The present invention relates to a pixel signal processing method for reducing an offset component included in a current signal output through a pixel signal line from each picture element of a solid state imaging device. In accordance with a preferred exemplary embodiment, a voltage of the pixel signal line is maintained at an almost constant voltage having been determined in advance while the current signal output through the pixel signal line is received as a current signal.

Sampling of a component of the received current signal during a resetting period for every picture element is carried out so that a differential between the sampled component and a component of the current signal in the detecting period can be calculated. This allows a signal in which the offset component is reduced to be picked up.

Also, the present invention relates to a pixel signal processing apparatus for carrying out the above-mentioned pixel signal processing method. In accordance with a preferred exemplary embodiment, the pixel signal processing apparatus comprises a voltage operating-point setting portion for maintaining a voltage of the above pixel signal line at an almost constant voltage having been determined in advance. In the exemplary embodiment, a current sampling portion receives a current signal output through the pixel signal line as a current signal when the voltage operating-point setting portion maintains a voltage operating point of the pixel signal line at a constant voltage. The sampling of a component of the received current signal in a resetting period preferably takes place for every picture element. Calculating the differential between the sampled component and a component of the current signal in a detecting period thereby enables picking up a signal component in which an offset component is reduced.

In the above pixel signal processing apparatus, the voltage operating-point setting portion may include a current-current converting portion for receiving the current signal output through the pixel signal line to output to the current sampling portion a current signal in a corresponding size to the received current signal.

The above current-current converting portion preferably includes a current mirror circuit whose input side element is connected to the pixel signal line and an output side element which is provided on the current sampling portion side are mirror-connected.

In the above case, a constant-current characteristic improving portion for improving a constant-current characteristic of the current mirror circuit is preferably provided between a current output terminal of the output side element forming the current mirror circuit and the current sampling portion. This may be accomplished by providing in series a transistor having a controlling input terminal, for example. In this case, it is preferable to control the controlling input terminal of the transistor so as to keep a voltage between input and output terminals of the output side element forming the current mirror circuit (a voltage between a source and a drain, for example) almost constant.

In the pixel signal processing apparatus in accordance with the invention, the current sampling portion may be arranged to perform only once a process for sampling and a process for calculating differential so that a signal component in which an offset component is reduced would be picked up.

The current sampling portion may also be arranged to comprise a current copier including current input and output terminals for receiving and holding in an input phase corresponding to a resetting period a current component of a current signal during the resetting period and for outputting in an output phase corresponding to a detecting period the current component held in the input phase. In this case, during the detecting period of the current signal, the current sampling portion calculates the differential between a current component in the detecting period and the current component output from the current input and output terminals of the current copier to pick up a signal component in which an offset component is reduced.

It is preferable to provide between the current input and output terminals of the current copier and the voltage operating-point setting portion a current-maintaining characteristic improving portion for improving a current-maintaining characteristic of the current copier by providing in series a transistor having a controlling input terminal, for example. In this case, it is preferably arranged that controlling the controlling input terminal of the transistor allows a voltage of the input and output terminals of the current copier (a voltage between a source and a drain of a transistor forming a main portion of a cell, for example) to be kept almost constant.

In the pixel signal processing apparatus in accordance with an exemplary embodiment of the invention, the current sampling portion may comprise: a switching element for turning on and off a current signal; a capacitative element for receiving a current signal when the switching element is on in a resetting period so as to hold a voltage corresponding to the current signal; and a current mirror circuit in which an input side element connected to the voltage operating-point setting portion and an output side element are mirror-connected.

In this case, during the detecting period of the current signal, the current sampling portion calculates the differential between a component output from the output side element of the current mirror circuit in the detecting period and a current component corresponding to a voltage held by the capacitative element to pick up a signal component in which an offset component is reduced.

In the pixel signal processing apparatus in accordance with an exemplary embodiment of the invention, the current sampling portion may comprise: a switching element for turning on and off a current signal; a capacitative element for receiving a current signal when the switching element is on in a resetting period so as to hold a voltage corresponding to the current signal; and a current mirror circuit in which an input side element provided on the capacitative element side and an output side element are mirror-connected.

In this case, during a detecting period of the current signal, the current sampling portion calculates differential between a current component in the detecting period and a current component corresponding to a voltage held by the capacitative element, the latter current component being output from the output side element of the current mirror circuit, to pick up a signal component in which an offset component is reduced.

An imaging apparatus in accordance with an alternate exemplary embodiment of the invention comprises: a solid imaging device for outputting a current signal from each picture element through a pixel signal line; and a pixel signal processing apparatus.

In the above structure, the voltage operating-point setting portion maintains a voltage of a pixel signal line of a current output type of solid imaging device at an almost constant voltage having been determined in advance. Under the above condition, the current sampling portion receives a current signal output through the pixel signal line as a current signal. That is to say, such as a sample hold circuit comprising a current copier, a switching element and a capacitative element, for example. This is used for carrying out sampling of a pixel signal in a resetting period in the shape of current component, after a pixel signal is read out with a voltage level of the pixel signal line being kept constant. Calculating a differential between a current component in a detecting period and an offset current, which is a current component in the resetting period for which the sampling has been performed allows an offset component included in the pixel signal to be removed so that a pure signal would be only picked up.

PREFERRED EXEMPLARY EMBODIMENTS OF THE PRESENT INVENTION

Figure 1:
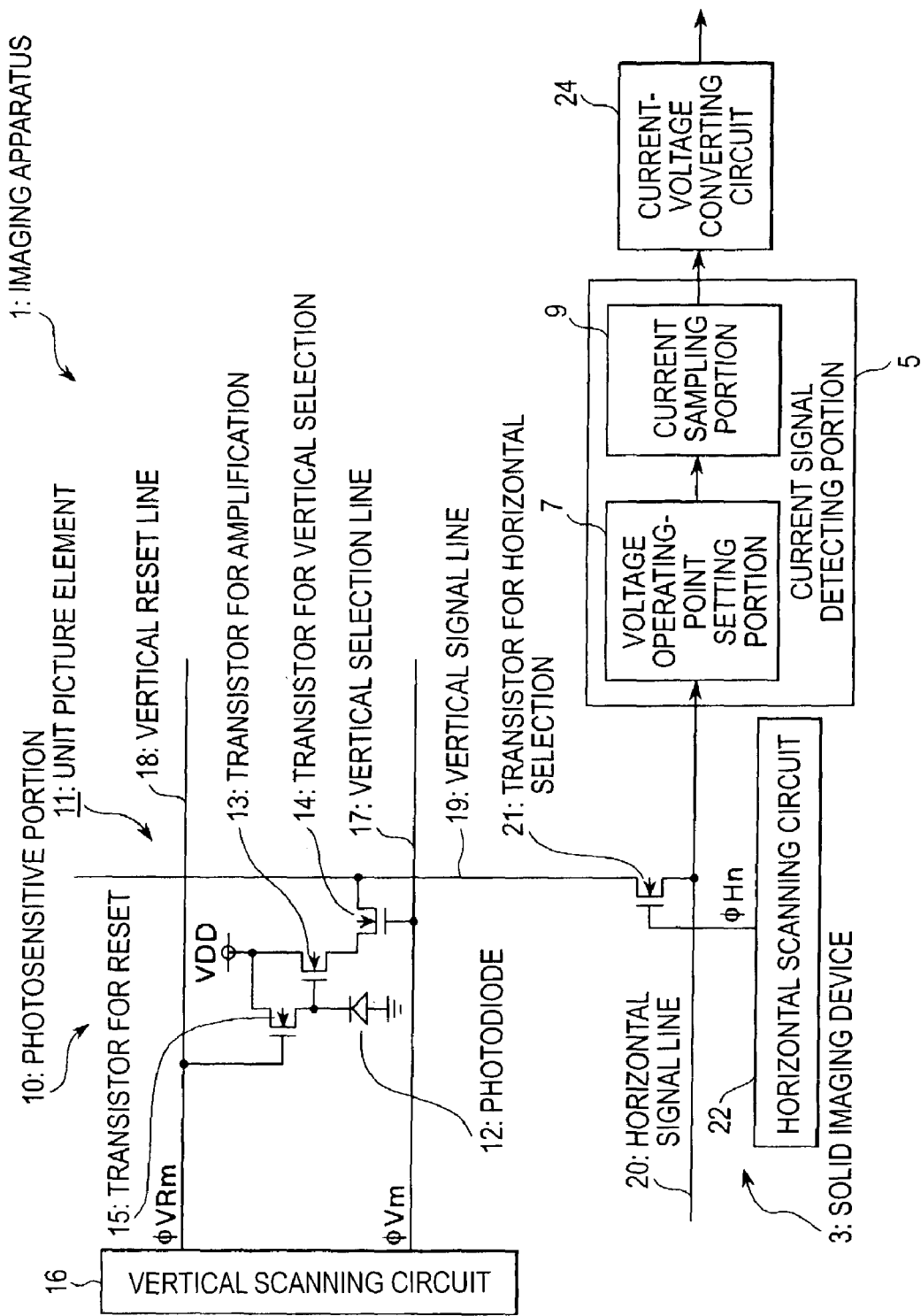
FIG. 1 is a first exemplary embodiment of an imaging apparatus comprising a current-output type of solid imaging device and a current signal detecting portion.

FIG. 1 shows an example of a structure of the first exemplary embodiment of an imaging apparatus comprising a current-output type of solid imaging device and a current signal detecting portion. The current signal detecting portion is an example of a pixel signal processing apparatus according to the invention. An imaging apparatus 1 comprises a CMOS type of imaging device, for example, as a solid imaging device 3. The imaging apparatus 1 also comprises a current signal detecting portion 5 comprising a voltage operating-point setting portion 7 and a current sampling portion 9 in a subsequent step of the solid imaging device 3. The solid imaging device 3 and the current signal detecting portion 5 may be formed on a single semiconductor substrate.

In FIG. 1, a unit picture element 11 of a photosensitive portion 10 forming the solid imaging device 3 comprises a photodiode 12, a transistor for amplification 13, a transistor for vertical selection 14 and a transistor for reset 15. An N-channel MOS transistor is used for the above transistors 13 to 15 in this embodiment. The unit picture element 11 is arranged in the X direction (a direction of a column) and the Y direction (a direction of a line) to form a pixel portion. Unit picture element in the m line and the n column is only shown in FIG. 1 for the purpose of simplification of the drawing.

In the unit picture element 11, a vertical scanning pulse φVm is given to a gate electrode of the transistor for vertical selection 14 from a vertical scanning circuit 16 through a vertical selection line 17. A vertical resetting pulse φVRm is given to a gate electrode of the transistor for reset 15 from the vertical scanning circuit 16 through a vertical reset line 18. A signal charge having been photo-electrically converted in the photodiode 12 is converted into a signal current in the transistor for amplification 13 to be output to a vertical signal line 19 through the transistor for vertical selection 14.

A transistor for horizontal selection 21 is connected between the vertical signal line 19 and a horizontal signal line 20. A horizontal scanning pulse φHn is applied to a gate electrode of the transistor for horizontal selection 21 from a horizontal scanning circuit 22. Thus, the signal current output from the picture element 11 to the vertical signal line 19 flows to the horizontal signal line 20 through the transistor for horizontal selection 21.

The current signal detecting portion 5 is connected to an end of the horizontal signal line 20. The horizontal signal line 20 is further connected to a current-voltage converting circuit 24 through the voltage operating-point setting portion 7 and the current sampling portion 9 is provided on the inside of the current signal detecting portion 5. The current sampling portion 9 receives a pixel signal as an electric current through the horizontal signal line 20, which is an example of a pixel signal line. The current sampling portion 9 samples the received current to remove an offset current included in the above current signal and to pick up only a pure signal. FPN (fixed pattern noise) in the pixel signal is thus reduced.

The voltage operating-point setting portion 7 stably keeps a voltage of the horizontal signal line 20 at a roughly constant level (near a GND level, for example,) in detecting (sampling) a current signal in the current signal detecting portion 5. The current-voltage converting circuit 24 converts a signal current input from the horizontal signal line 20 through the current signal detecting portion 5 into a signal voltage, which is output.

Figure 2:
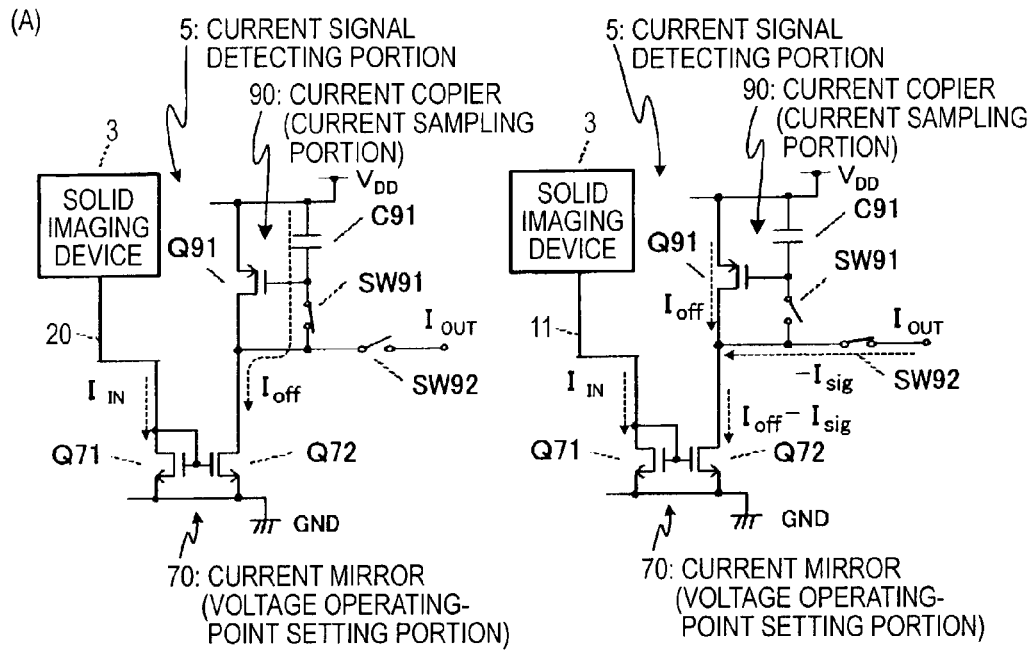
FIG. 2 is a first exemplary embodiment of the current signal detecting portion.
Figure 2:
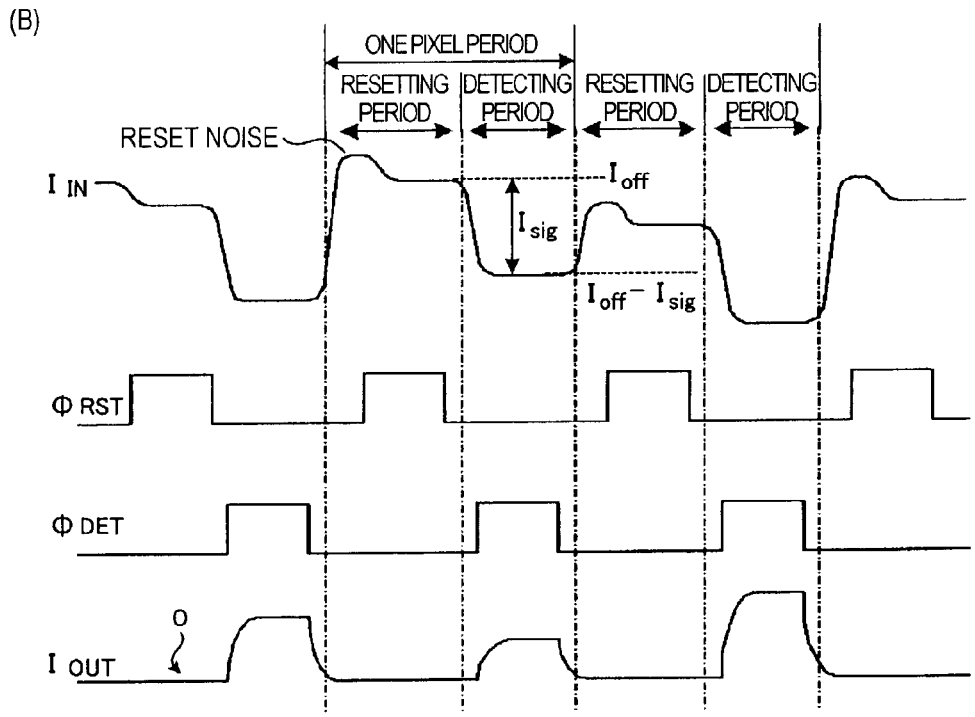

FIG. 2 shows an example of a structure of the first embodiment of the current signal detecting portion 5, which is an example of a pixel signal processing apparatus according to an exemplary embodiment of the invention. FIG. 2A is a circuit diagram thereof while FIG. 2B is a timing chart illustrating its operation. The structure of the first embodiment is characterized in that a current mirror 70 is used for the voltage operating-point setting portion 7 and that a current copier (a current storing cell) 90 is used for the current sampling portion 9.

The current mirror 70 is an example of a current-current converting portion for receiving a current signal output through the horizontal signal line 20, which is an example of a pixel signal line of the solid imaging device 3, to output a current signal in a corresponding size to the received current signal.

The current mirror 70 comprises an NchMOS transistor Q71 whose drain and gate are connected in common to the horizontal signal line 20 while whose source is connected to a ground of reference of potential, the NchMOS transistor Q71 being used for an element on the input side, and an NchMOS transistor Q72 whose gate and the above NchMOS transistor Q71 are connected in common while whose source is connected to a ground (GND) The NchMOS transistor Q72 is used for an element on the output side, as shown in FIG. 2A. That is to say, the pixel signal line 20 in which a signal flows from the solid imaging device 3 is connected to the current mirror 70 comprising the NchMOS transistors Q71 and Q72. Both NchMOS transistors Q71 and Q72 preferably have the same characteristics.

As shown in FIG. 2A, the current copier 90 comprises a PchMOS transistor Q91 whose drain for input and output terminals is connected to the drain of the NchMOS transistor Q72 while whose source is connected to a power source line VDD. A capacitive element C91 for sampling is connected between a gate of the PchMOS transistor Q91 and the power source line VDD. A switching element SW91 is connected between the gate and drain of the PchMOS transistor Q91 and a switching element SW92 is connected between the drain of the PchMOS transistor Q91 and a current output terminal Iout.

The output of the current mirror 70, namely, a drain terminal of the NchMOS transistor Q72 is first connected to a drain terminal of the PchMOS transistor Q91. The capacitive element C91 for sampling is connected between the PchMOS transistor Q91 and the power source voltage VDD to a gate of the PchMOS transistor Q91. The switching element SW91 is inserted between the gate and the drain. The current copier 90 is thus constructed.

The switching element SW92 is connected to the extended portion of a node of the drain terminals of the NchMOS transistor Q72 and the PchMOS transistor Q91 so as to be connected to the output terminal Iout.

As shown in FIG. 2A1, the current copier 90 enters an input phase when the switching element SW91 is controlled to be conductive while the switching element SW92 is controlled not to be conductive. The current copier 90 enters an output phase when the switching element SW91 is controlled not to be conductive while the switching element SW92 is controlled to be conductive, as shown in FIG. 2A2.

In an example shown in FIG. 2A, the solid state imaging device 3 comprises an NchMOS transistor as the amplification transistor 13, and therefore, an NchMOS transistor is used for the current mirror 70 and a PchMOS transistor is used for the current copier 90, respectively. In the case that the solid imaging device 3 comprises a PchMOS transistor as the amplification transistor 13, however, polarity of Nch and Pch of the transistors used in FIG. 2A can be reversed for the purpose of using the transistors for the current mirror 70 and the current copier 90.

FIG. 2B shows a controlling pulse ΦRST of the switching element SW91, a controlling pulse ΦDET of the switching element SW92 and an output signal waveform Iout appearing at the output terminal Iout in accordance with an output signal waveform IIN of the solid imaging device 3. The controlling pulses ΦRST and ΦDET control the respective switching elements so that the switching elements would be conductive (on) during a high (H) period and would not be conductive (off) during a low (L) period. Such switching control by means of the pulses ΦRST and ΦDET allows the PchMOS transistor Q91 and the capacitive element C91 to operate as a current copier.

A signal current IIN having a signal waveform shown in FIG. 2B is supplied from the solid imaging device 3 to the NchMOS transistor Q71 of the current mirror 70 through the horizontal signal line 20. The signal waveform is same as a general output signal waveform of a current-output type of solid imaging device. For example, one pixel period consists of a reset period and a detecting period. During the reset period, a signal Ioff is output, which is an offset component, while a detecting current "Ioff-Isig" is output during the detecting period. The differential Isig therebetween is an originally necessary signal current.

The signal current IIN output from the solid imaging device 3 is supplied through the pixel signal line 20 to the current mirror 70 comprising NchMOS transistors Q71 and Q72. The current mirror 70 operates so that the current on the input and output sides would be same. Thus, the signal current inputted to the NchMOS transistor Q71 appears at a drain of the NchMOS transistor Q72 as it is.

As shown in FIG. 2A1, the switching element SW91 is controlled to be conductive during the H period of the controlling pulse ΦRST and the switching element SW92 is controlled not to be conductive during the L period of the controlling pulse ΦDET when the output signal IIN of the solid imaging device 3 is in the reset period. Then, the current copier 90 enters the input phase to input all of the current Ioff having flown from the solid imaging device 3 through the current mirror 70.

The voltage corresponding to the size of the above signal current (offset component) Ioff appears at a gate terminal of the PchMOS transistor Q91 to make the switching element SW91 non-conductive at the next moment, so that the capacitative element C91 would store the then gate voltage. The current copier 90 enters the output phase to store an offset current Ioff having been inputted in advance so that the offset current Ioff would continue to flow as it is.

Under such conditions, the output signal IIN of the solid imaging device 3 then enters the detecting period and a signal "Ioff-Isig" flows through the current mirror 70. The current copier 90, however, is in the output phase, and therefore, continues to make the current Ioff having been stored in the capacitative element C91 in advance flow. Making the switching element SW92 conductive at that time allows only the differential between the stored current Ioff of the current copier 90 and the signal current "Ioff-Isig" flowing through the current mirror 70 to appear at the terminal Iout. That is, "Iout=Ioff−(Ioff-Isig)=Isig", so that only the pure signal Isig including no offset component Ioff would appear at the terminal Iout.

As described above, using the structure of the first embodiment shown in FIG. 2 can remove the offset current Ioff, which causes FPN. Specifically, the device only picks up the original signal component Isig as a current signal Iout at the output terminal Iout. The CDS processing function (that is, the FPN restraining function) in the electric current mode can be thus fulfilled. The output current signal is converted into a continuous signal in a sample and hold circuit after I/V conversion in the current-voltage converting circuit 24 as in the case of a conventional imaging apparatus, although the output current signal is not a continuous wave.

The above circuit is characterized by comprising only a current mirror 70 consisting of NchMOS transistors Q71 and Q72 and a current copier 90 consisting of a PchMOS transistor Q91, a capacitative element C91 and switching elements SW91 and SW92 and by having significantly simple circuitry and a small number of elements. It is also characterized in that control of the current copier 90 functioning as a current sampling portion 9 is extremely simple since there are only two phases: storing in a resetting period; and outputting in a detecting period.

The potential of the pixel signal line 20 is always determined in accordance with the diode-connected NchMOS transistor Q71 forming a current mirror 70. The potential value would be a bias value corresponding to Vth of the NchMOS transistor Q71+the then current value and the transistor size. Selecting proper Vth and size of the transistor allows the value to be always stable in the vicinity of GND. Accordingly, the amplification transistor 13 in the solid imaging device 3 can constantly maintain a good amplification factor, which can prevent linearity from being deteriorated.

Figure 3:
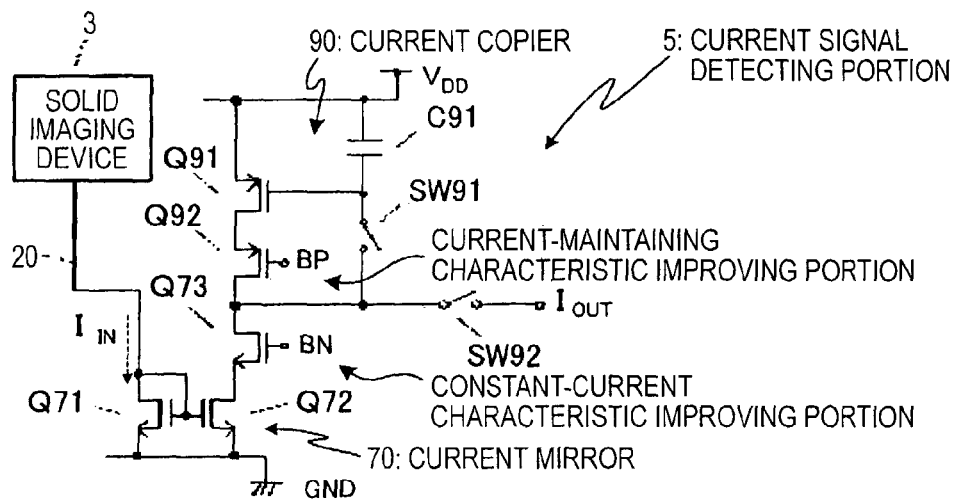
FIG. 3 illustrates a second exemplary embodiment of a current signal detecting portion.

FIG. 3 shows an example of a structure of the second embodiment of the current signal detecting portion 5. The current signal detecting portion 5 in the second embodiment is based on the structure of the first embodiment shown in FIG. 2 and further comprises an NchMOS transistor Q73 functioning as a constant-current characteristic improving portion according to the invention. The NchMOS transistor Q73 is provided in series with the NchMOS transistor Q72 functions as an output of the current mirror 70, and a PchMOS transistor Q92 functions as a current-maintaining characteristic improving portion according to the invention. The PchMOS transistor Q92 is provided in series with the PchMOS transistor Q91 forming the current copier 90, respectively. That is, the NchMOS transistor Q73 is inserted on the drain side of the NchMOS transistor Q72 and the PchMOS transistor Q92 is inserted on the drain side of the PchMOS transistor Q91, respectively in series.

The switching element SW91 is inserted between a gate terminal of the PchMOS transistor Q91 and a drain terminal of the PchMOS transistor Q92. A bias voltage BN is supplied to a gate of the NchMOS transistor Q73 while a bias voltage BP is supplied to a gate of the PchMOS transistor Q92.

The current mirror 70 generally operates to make input current also flow to the output side as it is. In the case that a drain voltage of a transistor on the output side varies largely, however, drain voltage dependence due to so-called early effect (channel length modulation effect) causes output conductance of the transistor to influence the output current, so that an error would occur in the output current. The NchMOS transistor Q73 is inserted in order to solve the problem. Inserting the NchMOS transistor Q73 in series with the NchMOS transistor Q72 can restrain potential variation on the output side of the current mirror 70 as well as improve constant-current characteristic. It is possible to add any constant-voltage or a voltage that actively change in operation to a gate of the NchMOS transistor Q73 as the bias voltage BN.

The current copier 90 generally operates to store a current in the input phase as it is to make the same current continue to flow also in the output phase. In the case that a drain voltage of a transistor forming the current copier 90 (a current copier cell) varies largely, however, the early effect also causes output conductance of the transistor to influence the current in the output phase, so that an error would occur in the current, which causes deterioration of the current-maintaining characteristic. In other words, accuracy in sampling of the current copier 90 is deteriorated.

The PchMOS transistor Q92 is inserted in order to solve the problem. Inserting the PchMOS transistor Q92 in series with the PchMOS transistor Q91 can reduce voltage variation at a drain end of the transistor, enhance accuracy in sampling and improve current-maintaining characteristic of the current copier. It is possible to add any constant-voltage or a voltage that actively change in operation to a gate of the PchMOS transistor Q92 as the bias voltage BP.

In accordance with the above structure of the second embodiment, the effect in reducing voltage variation at a drain end allows errors in the current flowing from the current mirror 70 and in the current flowing from the current copier 90 to be decreased, so that a highly accurate CDS processing function in the current mode can be fulfilled, which increases the FPN reducing effect.

Figure 4:
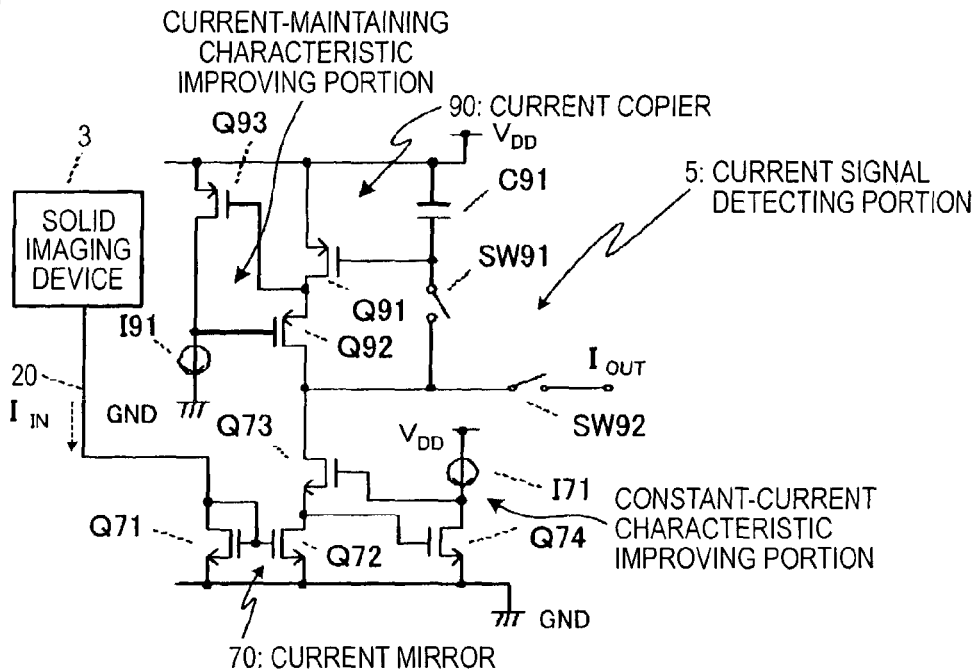
FIG. 4 illustrates a third exemplary embodiment of a current signal detecting portion.

FIG. 4 shows an example of a structure of the third exemplary embodiment of the current signal detecting portion 5. The current signal detecting portion 5 in the third embodiment is based on the structure of the second embodiment shown in FIG. 3 and further comprises an NchMOS transistor Q74 and a constant-current power source 171, which are used for generating a gate voltage of the NchMOS transistor Q73, and a PchMOS transistor Q93 and a constant-current power source 191, which are useed for generating a gate voltage of the PchMOS transistor Q92.

That is to say, a gate terminal of the NchMOS transistor Q74 is connected to a drain terminal of the NchMOS transistor Q72 and a drain terminal of the NchMOS transistor Q74 is connected to a gate terminal of the NchMOS transistor Q73, respectively. The constant-current power source 171 is connected to the drain terminal of the NchMOS transistor Q74.

Furthermore, a gate terminal of the PchMOS transistor Q93 is connected to a drain terminal of the PchMOS transistor Q91 and a drain terminal of the PchMOS transistor Q93 is connected to a gate terminal of the PchMOS transistor Q92, respectively. The constant-current power source 191 is connected to the drain terminal of the PchMOS transistor Q93.

On the current mirror 70 side, a constant current is constantly supplied to the NchMOS transistor Q74 from the constant-current power source 171. Thus, when the NchMOS transistor Q74 operates in a saturation region, a constant voltage between a gate and a source Vgs is constantly generated regardless of the drain voltage of the NchMOS transistor Q74. The gate voltage of the NchMOS transistor Q73 is, as a result, determined so that the drain voltage of the NchMOS transistor Q72, which is an element forming the current mirror 70 on the output side, would be constantly of a constant value since the gate terminal is connected to the drain terminal of the NchMOS transistor Q72.

Then, the constant-current characteristic of the current mirror 70 becomes significantly higher than in the case where the gate voltage BN of the NchMOS transistor Q73 is simply maintained at a constant voltage, so that an error of the output current of the current mirror 70 can be reduced. In other words, the constant-current characteristic of the current mirror circuit can be improved.

On the current copier 90 side, a constant current is constantly supplied to the PchMOS transistor Q93 from the constant-current power source I91. Thus, when the PchMOS transistor Q93 operates in a saturation region, a constant voltage between a gate and a source is constantly generated regardless of the drain voltage of the PchMOS transistor Q93. The gate voltage of the PchMOS transistor Q92 is, as a result, determined so that the terminal voltage of the drain of the PchMOS transistor Q91, which is input and output terminals of the current copier 90, would be constantly of a constant value since the gate terminal is connected to the drain terminal of the PchMOS transistor Q91.

Then, accuracy in sampling of the current copier 90 becomes significantly higher than the case where the gate voltage BP of the PchMOS transistor Q92 is simply kept down at a constant voltage, so that an error of the output current of the current copier 90 can be reduced. In other words, the current-maintaining characteristic of the current copier 90 can be improved.

In accordance with the above structure of the third embodiment, effect in operating so that the drain voltage would be always constant allows the CDS processing function in the current mode to be fulfilled with much higher accuracy than the case of the structure of the second embodiment, which further increases the FPN restraint effect.

Figure 5:
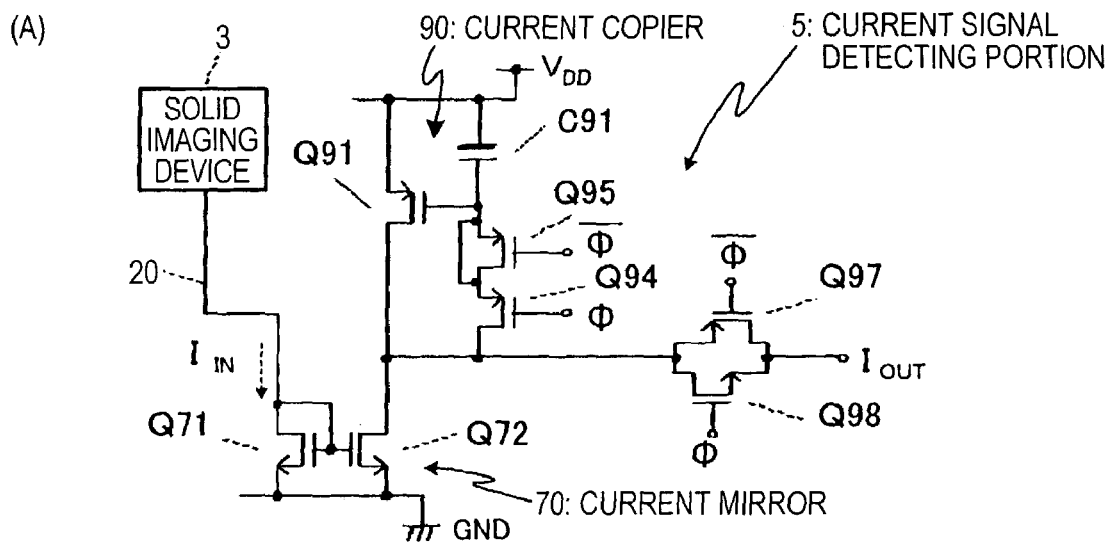
FIG. 5 illustrates a fourth exemplary embodiment of a current signal detecting portion.
Figure 5:
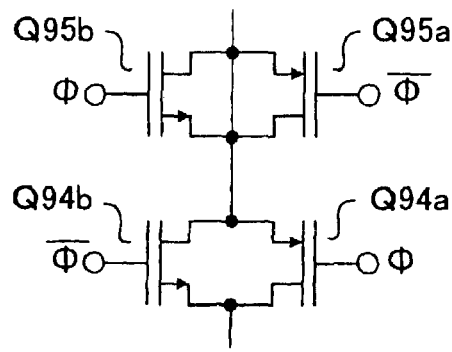

FIG. 5 shows an example of a structure of the fourth embodiment of the current signal detecting portion 5. FIG. 5A illustrates a basic structure while FIG. 5B illustrates a modified example. In the current signal detecting portion 5 of the fourth embodiment, the switching elements SW91 and SW92 in the structure of the first embodiment shown in FIG. 2 are formed by transistors.

As shown in FIG. 5A, the switching element SW91 used for sampling in the current copier 90 comprises PchMOS transistors Q94 and Q95. A source and a drain of the PchMOS transistor Q95 are short-circuited while a controlling pulse having a reverse phase is added to the PchMOS transistors Q94 and Q95.

As for the PchMOS transistors Q94 and Q95, the PchMOS transistor Q94 carries out a usual switching operation as a controlling pulse ΦDET. The PchMOS transistor Q94 produces a conductive condition during an L period (=a GND level) and a non-conductive condition during an H period (=a VDD level) of a controlling pulse added to the gate. That is to say, a control voltage having a reverse polarity to the controlling pulse ΦDET shown in FIG. 2B is supplied to the gate.

In the case that transistors are used for forming a switching element for sampling as described above, there is a problem of occurrence of noise, which is generally called field noise. More specifically, in transition of the PchMOS transistor Q94 from conductive to non-conductive state, charge stored in a depletion layer of a transistor or charge stored in a parasitic capacitance between a gate and a source are discharged to the capacitive element C91, which results in an error of potential stored in the capacitive element C91, in some cases.

The PchMOS transistor Q95 is used in order to solve the above problem. The PchMOS transistor Q95 short-circuits the source and the drain to add a controlling pulse having a reverse phase to the PchMOS transistor Q94 to the gate. That is to say, the PchMOS transistor Q95 is switched to the conductive condition when the PchMOS transistor Q94 is switched to the non-conductive condition. The PchMOS transistor Q95 draws the charge discharged from the PchMOS transistor Q94 in the above switching. Thus, the operation prevents the charge from being discharged to the capacitive element C91 resulting in reducing the potential error.

In the example shown in FIG. 5A, only a PchMOS transistor is used instead of the switching element SW91. A PchMOS transistor Q94a and an NchMOS transistor Q94b, however, may be connected in parallel as shown in FIG. 5B to form a structure of a so-called CMOS switch in which a source and a drain are alternately connected.

In this case, a PchMOS transistor Q95a and an NchMOS transistor Q95b are also connected in parallel in the structure of a CMOS switch so as to be used in the PchMOS transistor Q95 provided as a countermeasure against the field noise. The size of a transistor generally used as a countermeasure against the field noise is often made around half of the size of a transistor used for a switch.

On the other hand, the switching element SW92 is formed by a PchMOS transistor Q97 and an NchMOS transistor Q98, which are connected in a structure generally called a CMOS switch. A controlling pulse having a reverse phase is also added to the switch element SW92. A controlling pulse added to the gate can produce conductive and non-conductive conditions. The switching element SW92 may comprise only the PchMOS transistor Q97 or only the NchMOS transistor Q98 as the case may be.

Figure 6:
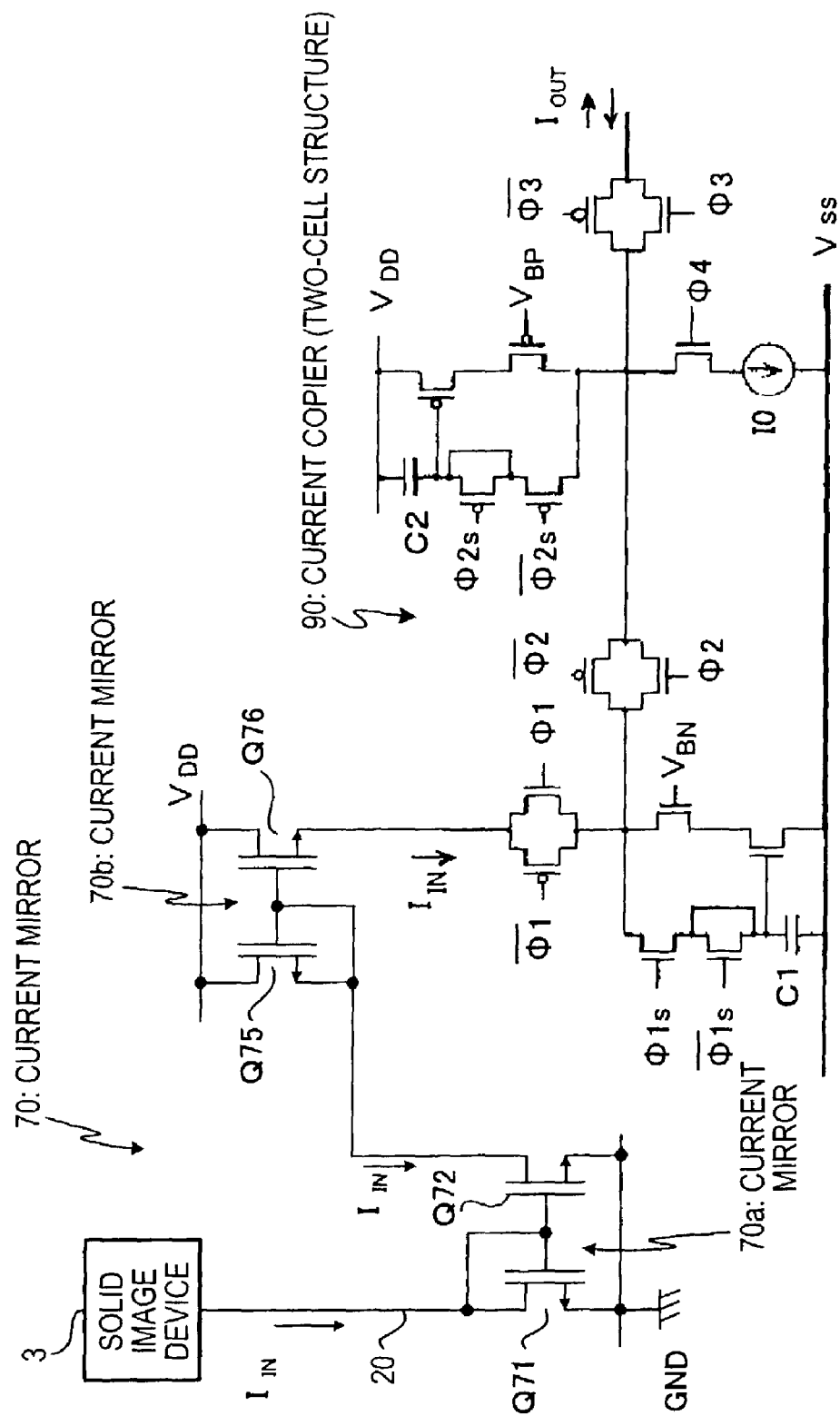
FIG. 6 illustrates a fifth exemplary embodiment of a current signal detecting portion.

FIG. 6 shows an example of a structure of the fifth embodiment of the current signal detecting portion 5. In the current signal detecting portion 5 in the fifth embodiment, the current mirror 70 is a two-step structure, which is an example of a voltage operating-point setting portion that is combined with a current copier in a two-cell structure.

The current mirror 70 of the fifth embodiment comprises a second step of current mirror 70b on the drain side of the NchMOS transistor Q72 forming a first step of current mirror, the second step of current mirror 70b comprising a PchMOS transistor Q75 whose drain and gate are connected in common and whose source is connected to a power source VDD and a PchMOS transistor Q76 whose gate is connected in common with the PchMOS transistor Q75 and whose source is connected to a power source VDD. Both PchMOS transistors Q75 and Q76 preferably have the same characteristics.

In the structure of the fifth embodiment, a signal current IIN flowing from the solid imaging device 3 through the pixel signal line 20 is received in the first step of current mirror 70a comprising the NchMOS transistors Q71 and Q72, and then, supplied to the current copier 90 through the second step of current mirror 70b comprising the PchMOS transistors Q75 and Q76.

A method of detecting a current signal in the structure of the fifth embodiment is same as that of the structure shown in FIG. 2. Only a pure signal Isig including no offset component Ioff appears at a terminal Iout. The diode-connected Nch- MOS transistor Q71 forming the first step of current mirror 70a constantly maintains potential of the pixel signal line 20 at an almost constant value. Accordingly, the amplification transistor 13 in the solid imaging device 3 can constantly maintain a good amplification factor, which can prevent linearity from being deteriorated as in a case of the first embodiment.

Figure 7:
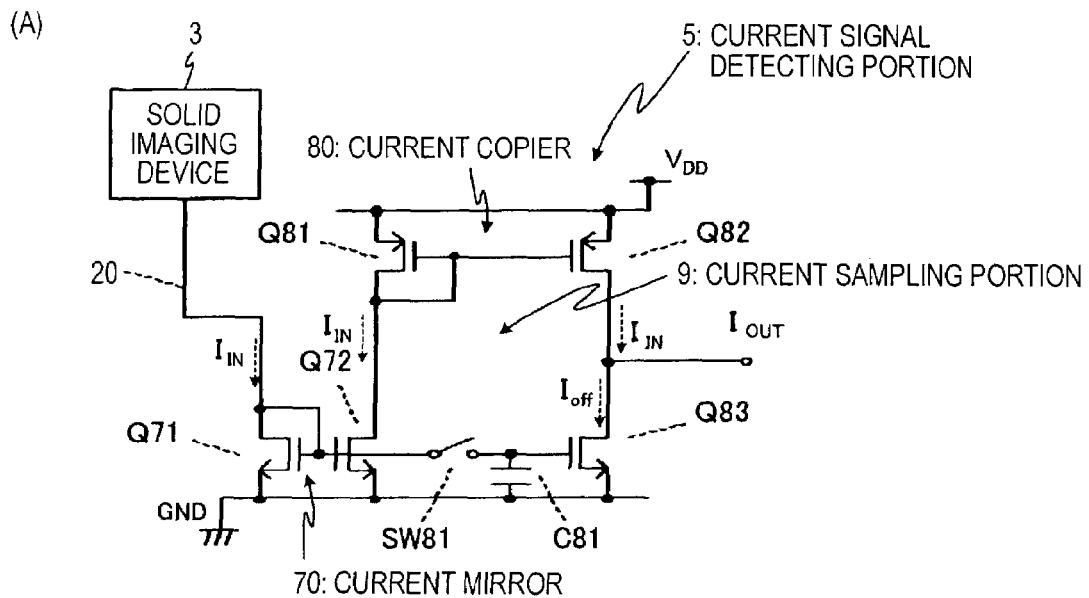
FIG. 7 illustrates a sixth exemplary embodiment of a current signal detecting portion.
Figure 7:
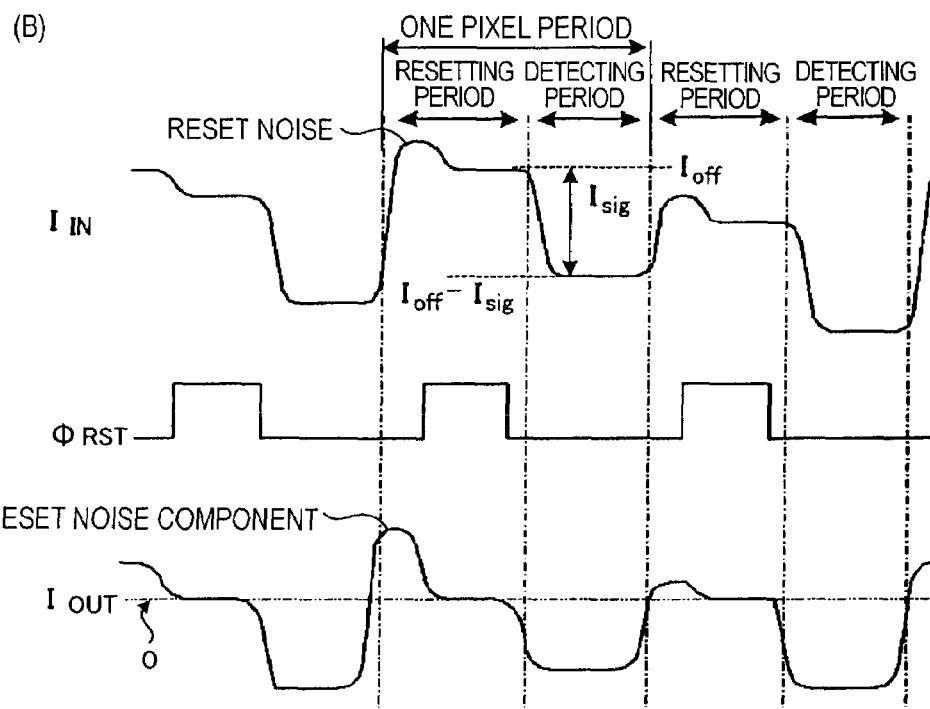

FIG. 7 shows an example of a structure of the sixth embodiment of the current signal detecting portion 5. FIG. 7A is a circuit diagram thereof and FIG. 7B is a timing chart illustrating an operation. The current signal detecting portion 5 in the sixth embodiment is characterized by using a current mirror 70 as a voltage operating-point setting portion 7 as in the first to fifth embodiments on one hand, and also using, instead of the current copier 90 in the first to fifth embodiments, as a current sampling portion 9, a switching element SW81 for switching a current signal on and off. A capacitative element C81 is employed for holding a voltage corresponding to the current signal received when the switching element SW81 is on, a current mirror 80, and a transistor Q83 forming a current mirror together with another transistor when the switching element SW 81 is on, on the other hand. A sample and hold circuit comprising the switching element SW81 and the capacitative element C81 and a current mirror perform the same operation as the current copier 90.

The current mirror 80 comprises a PchMOS transistor Q81 whose drain and gate are connected in common on the drain side of the NchMOS transistor Q72, which is a component of the current mirror 70 functioning as a voltage operating-point setting portion 7, and whose source is connected to the power source VDD. The PchMOS transistor Q81 is an element on the input side, and there is a PchMOS transistor Q82 whose gate is connected in common with the PchMOS transistor Q81 and whose source is connected to the power source VDD. The PchMOS transistor Q82 is an element on the output side. Both PchMOS transistors Q81 and Q82 preferably have the same characteristics.

A gate of the NchMOS transistor Q71 is connected to an end of the capacitative element C81 and a gate of the NchMOS transistor Q83 through the switching element SW81. The other end of the capacitative element C81 and a source of the NchMOS transistor Q83 are connected to GND, which is voltage reference.

A controlling pulse ΦRST for controlling the switching element SW81 is supplied to the switching element SW81. The switching element SW81 is conductive (on) only when the controlling pulse ΦRST is in the H period. As shown in FIG. 7B, the switching element SW81 is made conductive (on) only when the output current of the solid imaging device 3 is in the resetting period. The NchMOS transistors Q71 and Q83 form a current mirror when the switching element SW81 is on.

An operation of the current signal detecting portion 5 of the sixth embodiment will be described hereinafter. First of all, the NchMOS transistors Q71 and Q72 form the current mirror 70. The NchMOS transistor Q72 operates so that a signal current IIN received by the NchMOS transistor Q71 would flow as it is. The output current of the NchMOS transistor Q72 is further input to the current mirror 80 comprising the PchMOS transistors Q81 and Q82 to appear at a drain of the PchMOS transistor Q82 as an output current as it is.

In the case that the output current of the solid imaging device 3 is in the reset period, for example, the current mirror 70 inputs an offset current Ioff as it is to the current mirror 80 comprising the PchMOS transistors Q81 and Q82. The current mirror 80 outputs the offset current Ioff in the resetting period as it is to the NchMOS transistor Q83 and the output terminal Iout.

During the above resetting period, the offset current Ioff in the resetting period appears at a drain of the NchMOS transistor Q83 as it is since both gates of the NchMOS transistors Q71 and Q83 are connected each other via the switching element SW81 to form a current mirror. At that time, a gate of the NchMOS transistor Q71 is connected to the capacitative element C81 through the switching element SW81, so that the gate voltage of the NchMOS transistor Q71 would be stored and kept in the capacitative element 81.

In this case, differential in current between the NchMOS transistor Q83 and the PchMOS transistors Q82 is output to the output terminal Iout. At that point in time, however, a same size of offset current Ioff flows both from the NchMOS transistor Q83 and the PchMOS transistor Q82. Therefore, the output current Iout is "0" as shown in FIG. 7B.

The switching element SW81 is not conductive (off) when the output current of the solid imaging device 3 is in the detecting period. During the period, a gate voltage corresponding to the current flowing from the NchMOS transistor Q71 in the resetting period is stored and kept in the capacitative element C81 to be supplied to a gate of the NchMOS transistor Q83. The current corresponding to the voltage stored in the capacitative element C81, therefore, also flows from the NchMOS transistor Q83 even when the switching element SW81 is off.

When the NchMOS transistors Q71 and Q81 are in the same size, the NchMOS transistor Q83 continues to store the offset current Ioff in the resetting period of the solid imaging device 3 and to let the offset current Ioff flow even in the case that the switching element SW81 is off, as a result. In other words, the NchMOS transistor Q83 continues to store the offset current Ioff in the preceding resetting period.

During the detecting period, the NchMOS transistor Q72 inputs the detecting current "Ioff-Isig" in the detecting period as it is to the current mirror 80 comprising the PchMOS transistors Q81 and Q82 since the NchMOS transistor Q72 forms a current mirror together with the NchMOS transistor Q71. The current mirror 80 further outputs the detecting current "Ioff-Isig" in the detecting period as it is to the NchMOS transistor Q83 and the output terminal Iout.

Differential in current between the NchMOS transistor Q83 and the PchMOS transistor Q82 is then output to the output terminal Iout. Thus, "Iout=(Ioff-Isig)-Ioff=-Isig", as shown in FIG. 7B, so that the signal component is only output from the output terminal Iout. That is to say, subtraction between the offset current Ioff in the resetting period flowing from the NchMOS transistor Q83 and the detecting current "Ioff-Isig" in the detecting period turning back to flow at the current mirror 80 comprising the PchMOS transistors Q81 and Q82 allows a pure signal component "-Isig" including no offset component Ioff to be generated.

In other words, during the detecting period of the current signal IIN, the current sampling portion 9 extracts a signal component "-Isig" in which an offset component is reduced by calculating differential between the current component "Ioff-Isig" output from the PchMOS transistor Q82, which is a element on the output side of the current mirror 80, and the current component Ioff corresponding to the voltage held by the capacitative element C81.

As described above, even in the structure of the sixth embodiment in which a current copier is not used as the current sampling portion 9, it is also possible, although a direction of the output current is reverse to that of the first to fifth embodiments in which a current copier is used, to remove the offset current Ioff causing the FPN and to only pick up the original signal component "−Isig" as the current signal Iout from the output terminal Iout, so that a function as a CDS circuit in the current mode can be fulfilled.

Different from the case of the first to the fifth embodiments, a resetting noise component appears at the output terminal Iout when the controlling signal ΦRST to the switching element SW81 is off in the resetting period. The resetting noise component is not a matter, however, since it can be removed in a process of conversion into a continuous signal voltage, that is, a process of conversion into a continuous signal in a sample and hold circuit after I/V conversion in the current-voltage converting circuit 24. Therefore, it is not a problem.

The circuit of the sixth embodiment is also characterized by comprising only a current mirror 70 consisting of Nch-MOS transistors Q71 and Q72, a current mirror 80 consisting of a switching element SW81, a capacitative element C81 and PchMOS transistors Q81 and Q82 and a current sampling portion 9 comprising an NchMOS transistors Q83 forming a current mirror together with an NchMOS transistors Q71 when the switching element SW81 is on and by having significantly simple circuitry and a small number of elements almost as well as in the case of the first to fifth embodiments. It is also characterized in that control of the current sampling portion 9 is extremely simple since there are only two phases: storing in a resetting period; and outputting in a detecting period.

Figure 8:
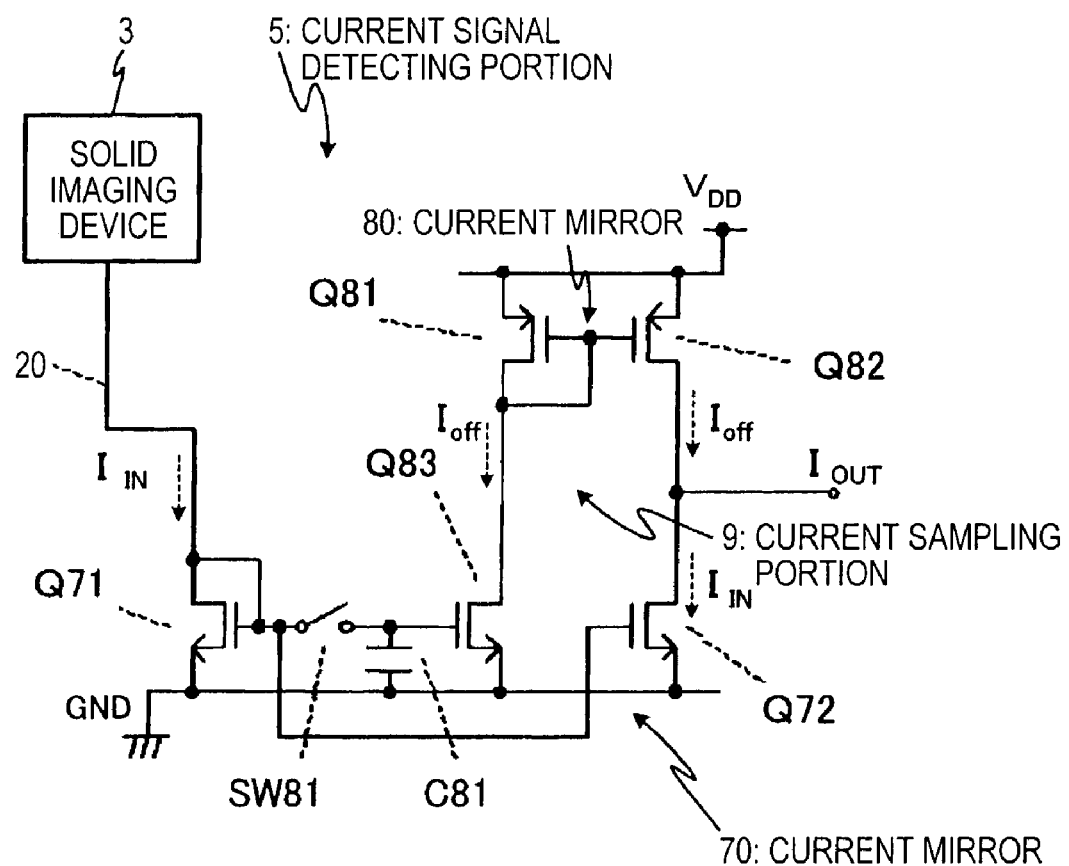
FIG. 8 illustrates a seventh exemplary embodiment of a current signal detecting portion.

FIG. 8 shows an example of a structure of the seventh embodiment of the current signal detecting portion 5. The current signal detecting portion 5 in the seventh embodiment has the same structure as that of the sixth embodiment shown in FIG. 7. For example, the current signal detecting portion 5 stores and keeps in the capacitative element C81 the gate voltage corresponding to the current flowing from the Nch-MOS transistor Q71 during the resetting period to supply the gate voltage to a gate of the NchMOS transistor Q83.

On the other hand, the structure of the current mirror 80 is different from that of the sixth embodiment shown in FIG. 7 in that a drain of the PchMOS transistor Q81, which is an element on the input side, is connected to a drain of the NchMOS transistor Q83 connected to the capacitative element C81. Furthermore in that a drain of the PchMOS transistor Q82, which is an element on the output side, is connected to a drain of the NchMOS transistor Q72, which is an element on the output side of the current mirror 70.

That is to say, in the sixth embodiment, subtraction is carried out between the offset current Ioff in the resetting period flowing from the NchMOS transistor Q83 and the detecting current "Ioff-Isig" in the detecting period turning back to flow at the current mirror 80. In contrast with the above, subtraction is performed between the offset current Ioff in the resetting period turning back at the current mirror 80 and the detecting current "Ioff-Isig" in the detecting period flowing from the NchMOS transistor Q83, in the seventh embodiment. A basic operation and an effect thereof in the seventh embodiment are same as those in the sixth embodiment although a direction of the output current Iout is reverse to that of the sixth embodiment.

A transistor may also be inserted in series on the output side of a current mirror for the purpose of improving accuracy in the sixth and seventh embodiments, as described in the second embodiment. Moreover, a circuit for controlling a gate voltage of a transistor connected in series may be added in order to further improve accuracy, as described in the third embodiment. Furthermore, the switching element SW81 may be formed by means of a MOS transistor. In this case, a transistor as a countermeasure against field-through may be added in series, as described in the fourth embodiment.

As described above, in accordance with the above respective embodiments, a small number of components and a simple circuit can fulfill an FPN restraining function in a current mode. In addition, a controlling circuit can be simplified since the number of controlling signals is small and no complicated control is necessary.

Furthermore, it is possible to provide a structure in which a sampling process is only carried out once, as in the respective embodiments except the fifth embodiment. Thus, only one capacitative element is necessary for sampling, which can hold down the layout area in mounting the invention on a semiconductor. That is to say, it is possible to provide as an imaging apparatus a united type of solid imaging device itself in which a voltage operating-point setting portion or a current sampling portion is formed on a same semiconductor substrate as an imaging portion (a light receiving portion/pixel portion).

Moreover, potential of the pixel signal line is stable all the time in the FPN restraining process in the current sampling portion since potential of the horizontal signal line, which is the pixel signal line, is always kept down at a constant value in the voltage operating-point setting portion. For example, as described in the embodiments, a diode-connected Nch transistor can keep down and maintain the potential nearly at a GND level. Accordingly, an amplification transistor in a solid imaging device can maintain a high amplification factor, which can maintain good linearity.

In addition, inserting a transistor in series with an output of a current mirror or a current copier and further controlling a gate voltage of the transistor inserted in series can allow a constant-current characteristic thereof to be improved or accuracy in sampling to be enhanced. Then, accuracy of the FPN restraining function can be kept good even when a transistor produced in a process with large output conductance should be used. In the case of using a transistor as a switching element for sampling, it is also possible by adding a transistor together as a countermeasure against the field through noise to prevent accuracy in sampling from being deteriorated.

The invention has been described above with modes for carrying out the invention. The technical scope of the invention, however, is not limited to description of the above embodiments. Various modification or improvements can be added to the above modes for carrying out the invention and the mode including such modification or improvement is also included in the technical scope of the invention. The above-described embodiments do not limit the invention according to claims. Moreover, all of combination of characteristics described in the embodiments is not necessarily essential for solution in the invention.

For example, a current copier (current storing cell) is used for a current sampling portion in the first to fifth embodiments. The structure is not limited to that of each embodiment and another structure may be employed.

The current sampling portion is not limited to have a structure of the above embodiments. It may have any structure so long as it has a function of restraining or removing an offset component by calculating differential in output current from a solid imaging device between a held offset component in a resetting period and a detecting current component in a detecting period.

In the invention, inserting a transistor in series with an output of a current mirror or a current copier and controlling a gate voltage of the inserted transistor allows a constant-current characteristic to be improved or accuracy in sampling to be enhanced. It is also possible, however, to employ a known method for reducing influence of the early effect such as a current mirror circuit with a source resistance, a cascade type of current mirror circuit or a Wilson type of current mirror circuit, for example.

That is to say, a current mirror circuit per se can comprise a constant-current characteristic improving portion according to the invention in the structure. In the case of a current mirror circuit with a source resistance, it is possible to use a source resistance ratio to set a current gain in a current mirror functioning as a current-current converting portion regardless of the case that an input to an output is "1 to 1".

It has been described that an input-output converting factor of a current mirror functioning as a voltage operating-point setting portion is 1, but the structure is not limited to the above and a current gain may be included. The voltage operating-point setting portion is also not limited to use a current mirror and may have another structure.

Figure 9:
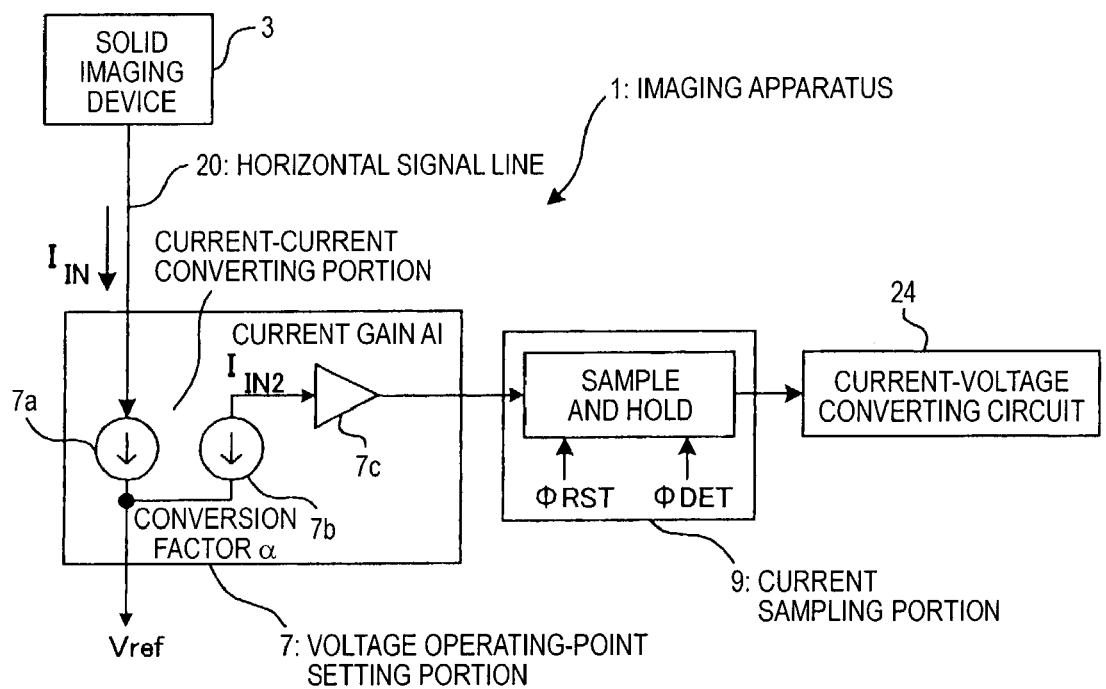
FIG. 9 is block diagram illustration showing modifications of an imaging apparatus.
Figure 9:
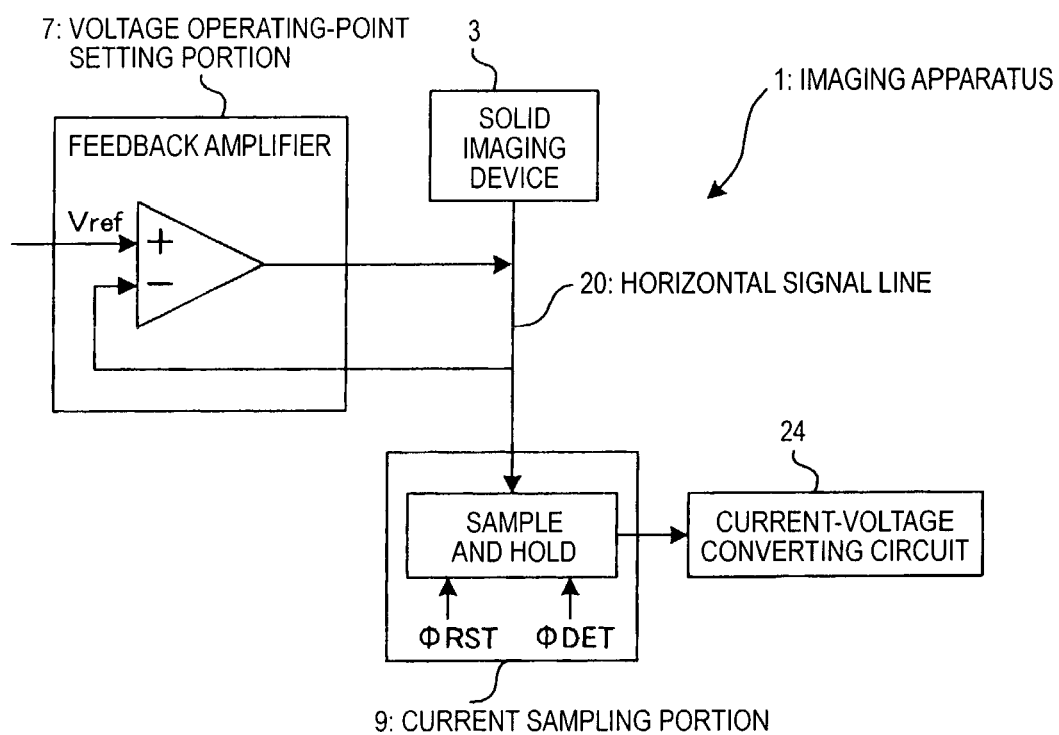
Figure 10:
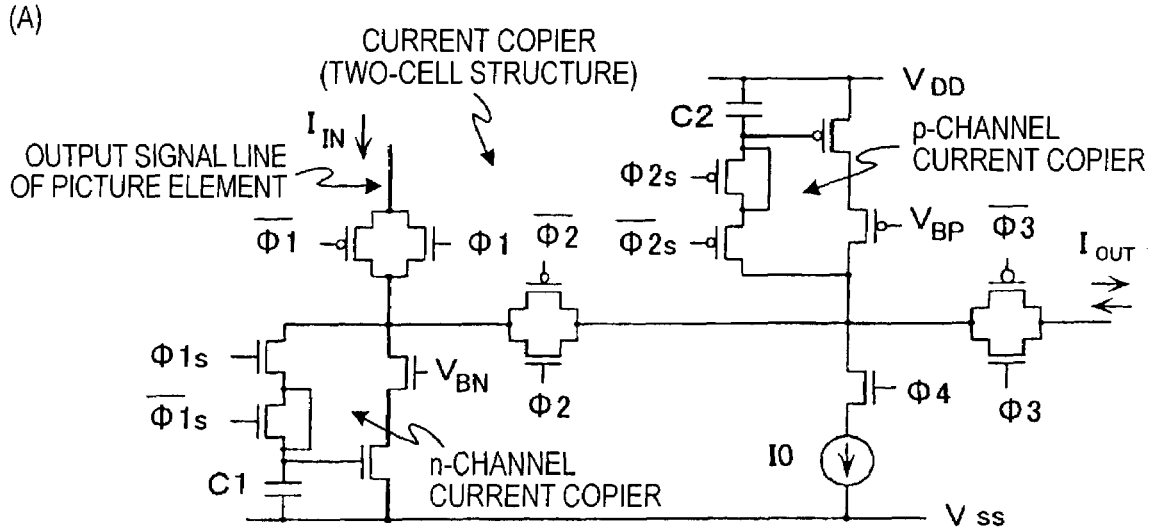
FIG. 10 illustrates a conventional structure for fulfilling a function of reducing fixed pattern noise.
Figure 10:
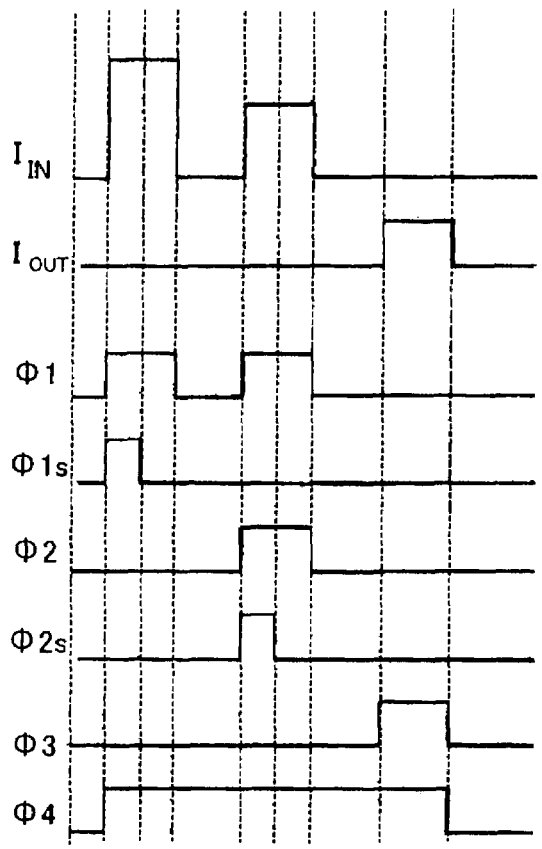
Figure 10:
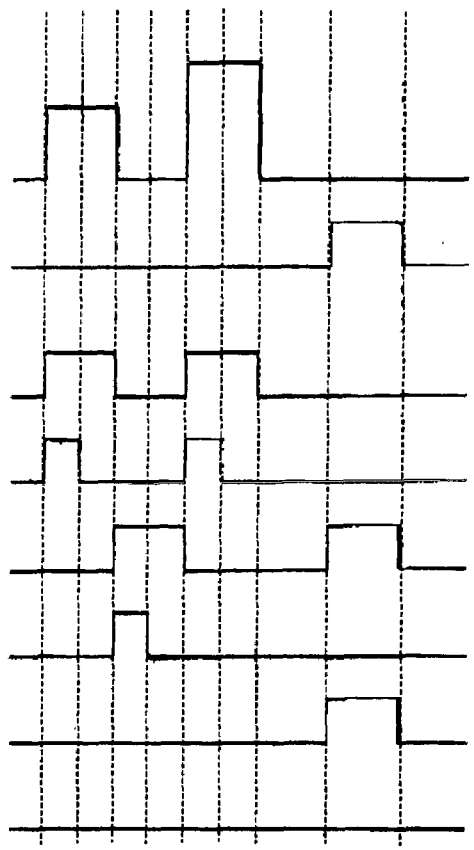

FIG. 9 shows block diagrams of an imaging apparatus comprehensively showing the above modifications. As shown in FIG. 9A, for example, it is possible to use as the voltage operating-point setting portion 7 a current/current converting portion comprising a current source 7a on a primary side, the current source 7a being connected to the horizontal signal line 20 of the solid imaging device 3 and receiving a current signal IIN outputted through the above horizontal signal line 2, and the current source 7b on the secondary side, the current source 7b outputting the signal current IIN received by the current source 7a to the current sampling portion 9 side as a current signal IIN2 in a corresponding size to the signal current IIN at a conversion factor α.

It may be arranged that a current amplifier 7c is provided in a step subsequent to the current source 7b on the secondary side so that a current gain AI would have a desired gain (which may be "1") to be output to the current sampling portion 9.

It is also possible, as shown in FIG. 9B, to combine a feedback-controlling type of voltage operating-point setting portion 7, which monitors a voltage at a connecting point between the pixel signal line (the horizontal signal line 20) of the solid imaging device 3 and the current sampling portion 9 comprising such as a sample & hold so that the voltage would be constantly kept at a reference voltage Vref.

In FIG. 9A, the voltage reference of the current sources 7a and 7b is not limited to the GND but may be any reference voltage Vref. The current sources 7a and 7b may be a mirror-connected current mirror circuit as described in the above respective embodiments.

A junction type of field effect transistor or a bipolar type of transistor may be used in the structure, although an example of using a MOS transistor for forming a voltage operating-point setting portion or a current sampling portion is described in the above embodiments.

Furthermore, an example of an area sensor in which a photosensitive portion is provided in a matrix (two-dimensionally) is described in the above embodiments. The invention is not limited to the above, however, and a line sensor may be used.

It goes without saying that each circuit described in the above embodiments can be modified into what has a complementary relation with the circuit.

As described above, in accordance with the invention, a voltage operating-point setting portion is arranged to maintain a voltage of a pixel signal line of a current output type of solid imaging device at an almost constant voltage having been determine in advance, so that an amplification transistor in the solid imaging device can maintain a high amplification factor, which can also maintain good linearity.

Furthermore, a current sampling portion receives a current signal output through a pixel signal line in the shape of current signal as it is and carries out sampling of a pixel signal in a resetting period in the shape of current component as it is (directly). Then, a differential between a current component in a detecting period and an offset current, which is a current component in sampling in the resetting period, is calculated to remove an offset component included in the pixel signal so as to only pick up a pure signal. Thus, a current-voltage converting circuit is not necessary since the FPN restraining function can be fulfilled in the current mode, so that the fixed pattern noise (FPN) can be reduced only by means of a compact circuit.

We claim:

1. A pixel signal processing method for reducing an offset component included in a current signal output through a pixel signal line comprising steps of:
   maintaining a voltage of the pixel signal line at a substantially constant voltage while receiving the current signal output through the pixel signal line as a current signal;
   sampling a component of the received current signal during a reset period in order to calculate a differential between the sampled component and a component of the current signal during a detecting period; and
   further processing a signal component in which the above offset component is reduced.

2. A pixel signal processing apparatus for reducing an offset component included in a current signal in a pixel signal line, comprising:
   a voltage operating-point setting portion for maintaining a voltage of the pixel signal line substantially at a constant voltage; and
   a current sampling portion for receiving the current signal when the voltage operating-point setting portion maintains a voltage operating point of the pixel signal line at the substantially constant voltage, and for calculating a differential between the sampled component and a component of the current signal during a detecting period, and a means for picking up a signal component in which the above offset component is reduced.

3. The pixel signal processing apparatus according to claim 2, wherein the voltage operating-point setting portion includes a current-current converting portion for receiving the current signal output through the pixel signal line and outputting to the current sampling portion a current signal in a size corresponding to the received current signal.

4. The pixel signal processing apparatus according to claim 3, characterized in that the above current-current converting portion includes a current mirror circuit whose input side is connected to the pixel signal line and an output side of the current sampling side are mirror-connected.

5. The pixel signal processing apparatus according to claim 4, further comprising between a current output terminal of the output side forming the current mirror and the current sampling portion a constant-current characteristic improving portion for improving a constant-current characteristic of the current mirror circuit.

6. The pixel signal processing apparatus according to claim 5, characterized in that the constant-current characteristic improving portion comprises a transistor having a controlling input terminal, the transistor being connected in series between the current output terminal of the output side element and the current sampling portion.

7. The pixel signal processing apparatus according to claim 6, characterized in that the constant-current characteristic improving portion controls the controlling input terminal of the transistor so as to keep a voltage between input and output terminals of the output side forming the current mirror circuit almost constant.

8. The pixel signal processing apparatus according to claim 2, characterized in that the current sampling portion performs only once a process for sampling and a process for calculating the differential so that a signal component in which the offset component is reduced is picked up.

9. The pixel signal processing apparatus according to claim 2, characterized in that the current sampling portion comprises a current copier including current input and output terminals for receiving and holding in an input phase corresponding to the resetting period, a current component of the current signal in the resetting period and for outputting in an output phase corresponding to the detecting period the current component held in the input phase, and further wherein, during the detecting period of the current signal, the current sampling portion calculates a differential between a component in the detecting period and the component output from the current input and output terminals of the current copier.

10. The pixel signal processing apparatus according to claim 9, further comprising; between the current input and output terminals of the current copier and the voltage operating-point setting portion a current-maintaining characteristic improving portion for improving a current-maintaining characteristic of the current copier.

11. The pixel signal processing apparatus according to claim 10, wherein the current-maintaining characteristic improving portion comprises a transistor having a controlling input terminal, the transistor being connected in series between the current input and output terminals of the current copier and the voltage operating-point setting portion.

12. The pixel signal processing apparatus according to claim 11, wherein the current-maintaining characteristic improving portion controls the controlling input terminal of the transistor to keep a voltage of the input and output terminals of the current copier almost constant.

13. The pixel signal processing apparatus according to claim 2, wherein the current sampling portion comprises: a switching element for turning on and off the current signal; a capacitative element for receiving the current signal when the switching element is on in the resetting period so as to hold a voltage corresponding to the current signal; and a current mirror circuit in which an input side element connected to the voltage operating-point setting portion and an output side element are mirror-connected, and further wherein, during the detecting period of the current signal, the current sampling portion calculates a differential between a component output from the output side element of the current mirror circuit in the detecting period and a current component corresponding to a voltage held by the capacitative element.

14. The pixel signal processing apparatus according to claim 2, wherein the current sampling portion comprises: a switching element for turning on and off the current signal; a capacitative element for receiving the current signal when the switching element is on in the resetting period so as to hold a voltage corresponding to the current signal; and a current mirror circuit in which an input side element provided on the capacitative element side and an output side element are mirror-connected, and further wherein during the detecting period of the current signal, the current sampling portion calculates a differential between a component in the detecting period and a current component corresponding to a voltage held by the capacitative element, the latter current component being output from the output side element of the current mirror circuit.

15. An imaging apparatus characterized by comprising:

a solid imaging device for outputting a current signal from each picture element through a pixel signal line;

a voltage operating-point setting portion for maintaining a voltage of the above pixel signal line at a substantially constant voltage; and a current sampling portion for receiving the current signal output through the pixel signal line as a current signal when the voltage operating-point setting portion maintains a voltage operating point of the pixel signal line at the constant voltage, and for carrying out sampling of a component of the received current signal in a resetting period for the every picture element, and a means for calculating a differential between the sampled component and a component of the current signal in a detecting period, and thereby, for picking up a signal component in which an offset component is reduced.

* * * * *